April 3, 1951 W. W. SALISBURY 2,547,412
HIGH-FREQUENCY MIXER
Filed May 23, 1945
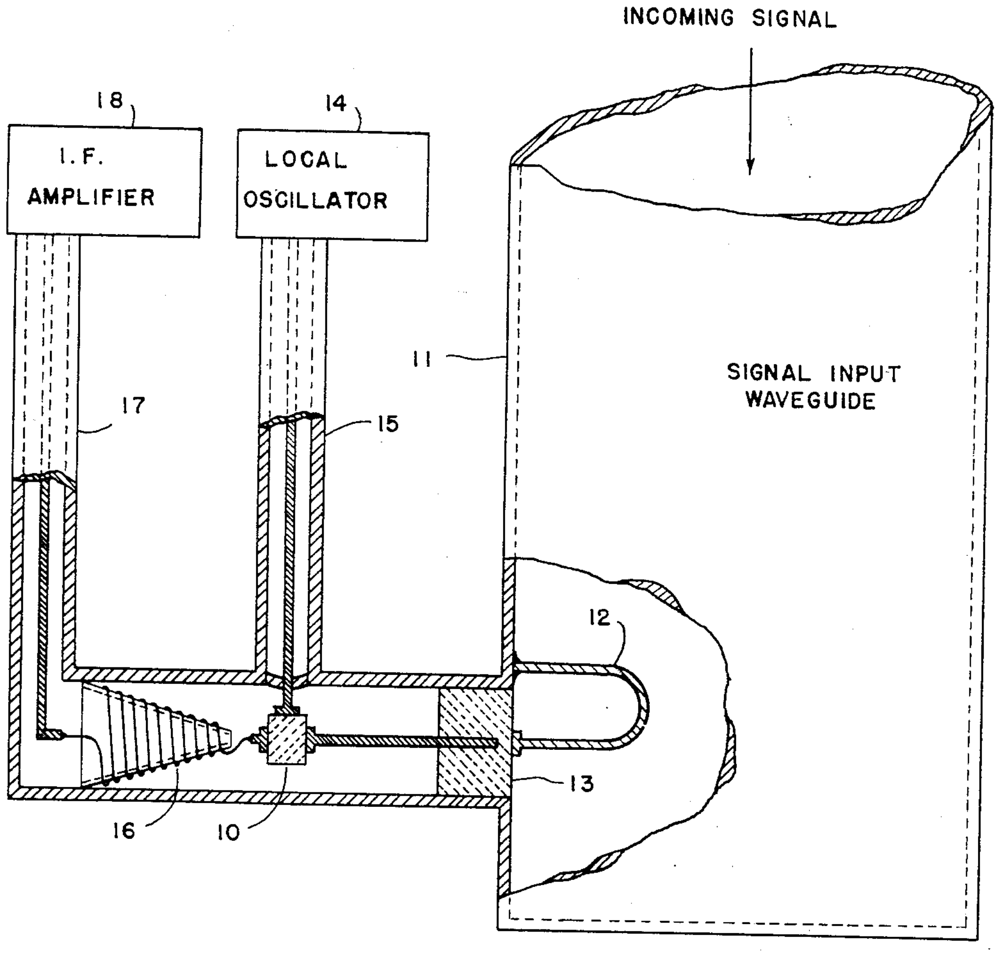
INVENTOR.
WINFIELD W. SALISBURY
BY William D. Hall,
ATTORNEY Patented Apr. 3, 1951

2,547,412

UNITED STATES PATENT OFFICE 2,547,412

HIGH-FREQUENCY MIXER

Winfield W. Salisbury, Cedar Rapids, Iowa, assignor to the United States of America as represented by the Secretary of War Application May 23, 1945, Serial No. 595,357

4 Claims. (Cl. 250—20)

The present invention relates generally to electrical circuits and more particularly to superheterodyne receiver frequency mixer circuits.

An object of this invention is to mix efficiently oscillations of two different high frequencies, one a signal frequency and the other a locally generated frequency, and then to select and to separate from other frequencies present a resultant desired fixed beat frequency and transmit it to succeeding receiver circuits.

It is a further object of the present invention to provide a wide band pass receiver but one which will be sharply cut off to the reception of signals out of that band. It is therefore necessary in the present receiver to eliminate all conventional sharply tuned circuits and to use circuits having a wide band characteristic but sharply limited at their cut-off frequencies.

The use of very high frequencies has introduced problems in the mixing of incoming signals with local oscillations which do not exist when lower frequencies are used. For example, the use of vacuum tubes, despite special design, as mixers for very high frequencies is limited and inefficient due to inherent characteristics of the vacuum tube. Use of crystals as mixers has removed some of the difficulties but serious problems still remain in conducting energy to the crystal without serious attenuation and in separating a pure intermediate frequency from the signal frequency, local oscillator frequency, and image frequency.

In the present invention a wave guide is used to introduce the incoming signal to a crystal mixer where it is combined with oscillations from a local generator to produce a fixed intermediate frequency. The dimensions of the incoming signal wave guide are chosen so that the cut-off frequency below which the wave guide will not pass signals corresponds to a frequency at the lower end of the band it is desired to pass by a receiver employing the present invention. Frequencies above those in the band it is desired to pass are attenuated by a novel and specially designed choke coil between the crystal mixer and the path to succeeding intermediate frequency amplifying circuits.

Other objects, features, and advantages of this invention will suggest themselves to those skilled in the art and will become apparent from the following description of the invention taken in connection with the accompanying drawing which is a cross-sectional diagrammatic view of a preferred embodiment of the invention.

Referring now to the drawing, a crystal mixer 10 is fed incoming signals from wave guide 11 by means of coupling loop 12 which is capacity loaded and coupled to the crystal mixer 10 by the condenser action of dielectric 13. Oscillations from a local oscillator 14 are fed through coaxial transmission line 15 to crystal mixer 10 where beat frequencies are generated.

Heterodyning of different frequencies occurs in crystal mixer 10. The predominant frequencies are the oscillator frequency plus and minus the incoming signal frequency. Other frequencies will be present due to heterodyning of harmonics of the incoming signal frequency and of other harmonics of the oscillator frequency but these will be of relatively low intensity. It is therefore desirable to select for the receiver intermediate frequency the frequency representing the difference between the oscillator frequency and the incoming signal frequency. All frequencies except the difference frequency between the local oscillator fundamental and the incoming signal are eliminated from succeeding circuits of the receiver by choke 16 which is designed to attenuate all frequencies higher than that chosen intermediate frequency and thus acts as a low pass filter. It follows that the only frequency impressed on the intermediate frequency amplifier 18 and the subsequent circuits of the receiver through coaxial transmission line 17 is that difference frequency.

Instead of the conventional cylindrical design, choke coil 16, used for this purpose, is of a tapered or conical shape, that is, having a larger diameter of cross-section at one end than at the other. This coil is connected so that its smaller end acts as the input end. As is well known, due to the effects of capacity between the turns of a conventionally designed choke coil and due to the effects of self-inductance, a given coil is resonant at one or more frequencies. Such a condition would be very disadvantageous in the circuits of a receiver for operation over a wide band of frequencies. The tapered design of choke coil 16 results in the effect of having no natural period of resonance within the range of frequencies above the pass band that would be accepted by the intermediate frequency amplifier because for all frequencies above those within the operating range some turns of the coil offer an inductive reactance. The choke coil 16 not only prevents unwanted difference frequencies from being passed on to the intermediate frequency amplifiers but it also prevents the local oscillator and signal frequencies from being impressed on the grid of the first tube in the intermediate frequency amplifier. The larger diameter turns offer a capacity reactance at frequencies above the operating frequencies but do not affect the operation. Thus the choke coil acts as a low pass filter which, at its input end, has sufficient impedance to prevent a short circuit of the signal frequencies.

Consequently, the tapered coil acts as an impedance element having approximately constant inductive reactance over a wide band of frequencies because as the operating frequency is decreased more turns of the coil become inductively reactive. Thus the effective inductance increases with decrease in frequency and inductive reactance remains substantially constant.

While there has been here described what is at present considered to be the preferred embodiment of the invention, it will be obvious to those skilled in the art that various changes and modifications may be made therein without departing from the scope of the invention.

What is claimed is:

1. In a superheterodyne receiver circuit including a crystal mixer and an intermediate frequency amplifier, a low pass filter connecting said crystal mixer and said intermediate frequency amplifier comprising an electrical transmission line having a constant diameter outer conductor and in series with the inner conductor an inductance coil wound on a tapered form with the small end of said coil adjacent said crystal mixer and the larger end of said coil adjacent said intermediate frequency amplifier, said coil being located concentrically within said outer conductor.

2. In a radio circuit including at least a crystal mixer and a load a low pass filter comprising a coaxial line having an electrically continuous outer conductor and an inner conductor having at least one gap therein, and at least one inductance coil wound on a tapered form and located coaxially within said outer conductor and within said gap in series with said inner conductor, said coil having the smaller end thereof connected to the inner conductor at the end of said gap adjacent said crystal mixer and having the larger end of said coil connected to the inner conductor at the end of said gap adjacent said load.

3. In a superheterodyne receiver circuit including a mixer and an intermediate frequency amplifier a low pass filter means connecting said mixer and said amplifier comprising a coaxial line having enclosed within the outer conductor thereof and in series with the inner conductor thereof an inductance coil wound on a tapered form and oriented coaxially with said inner conductor with the smaller end of said inductance coil adjacent the connection to said mixer and the larger end of said coil adjacent to the connection to said amplifier.

4. A high frequency mixer circuit comprising a signal input waveguide receptive of incoming signals and so dimensioned as to cut off all frequencies below a desired signal frequency, a crystal mixer, a local oscillator, a first coaxial cable having an outer conductor concentrically enclosing an inner conductor, one end of said inner conductor being electrically coupled to said waveguide to derive an output therefrom, the other end of said inner conductor serving to conduct said output from said waveguide to said crystal mixer by being connected to said crystal mixer, a second coaxial cable connected between said local oscillator and said crystal mixer, for conducting the output from said local oscillator to said crystal mixer in order to derive a difference frequency by beating said local oscillator output against said incoming signals, a low pass filter including an inductance coil wound in spiral and conical form to present a substantially constant high inductive reactance to all frequencies above said difference frequency and a low inductive reactance to said difference frequency, the smaller diameter end of said coil being connected to said mixer output, said coil and said mixer being located coaxially within the outer conductor and in series with the inner conductor of said first coaxial line, and a utilization circuit connected to the larger diameter end of said coil in order to derive said difference frequency therefrom.

WINFIELD W. SALISBURY.

REFERENCES CITED

The following references are of record in the file of this patent:

UNITED STATES PATENTS

| Number | Name | Date |
|---|---|---|
| 1,712,993 | Heising | May 14, 1929 |
| 1,978,446 | Aubert | Oct. 30, 1934 |
| 2,034,826 | Nyquist | Mar. 24, 1936 |
| 2,115,826 | Norton et al. | May 3, 1938 |
| 2,124,212 | Rust | July 19, 1938 |
| 2,142,159 | Southworth | Jan. 3, 1939 |
| 2,163,775 | Conklin | June 27, 1939 |
| 2,192,715 | Peterson | Mar. 5, 1940 |
| 2,253,589 | Southworth | Aug. 26, 1941 |
| 2,351,604 | Ferrill, Jr. | June 20, 1944 |
| 2,433,386 | Montgomery | Dec. 30, 1947 |
| 2,436,830 | Sharpless | Mar. 2, 1948 |
| 2,442,776 | Newkirk | June 8, 1948 |
| 2,455,657 | Cork et al. | Dec. 7, 1948 |
| 2,460,109 | Southworth | Jan. 25, 1949 |